(12) United States Patent
Dupuis et al.

(10) Patent No.: US 6,889,888 B2
(45) Date of Patent: May 10, 2005

(54) SPATIAL INTEGRATION OF PIPELINE DATASETS

(75) Inventors: Bruce Robin Dupuis, Calgary (CA); Michael John Webb, Pickardville (CA)

(73) Assignee: Baseline Technologies, Inc., Calgary (CA)

( * ) Notice: Subject to any disclaimer, the term of this patent is extended or adjusted under 35 U.S.C. 154(b) by 104 days.

(21) Appl. No.: 10/326,911

(22) Filed: Dec. 19, 2002

(65) Prior Publication Data

US 2004/0118898 A1 Jun. 24, 2004

(51) Int. Cl.[7] ............................ B23K 31/02; G06K 9/00; G01F 1/00
(52) U.S. Cl. ........................ 228/103; 228/102; 228/104; 382/141; 382/149; 73/227
(58) Field of Search ................................. 228/102, 103, 228/104; 73/227; 33/121, 544; 382/141, 149; 345/441, 666

(56) References Cited

U.S. PATENT DOCUMENTS

| | | | | |
|---|---|---|---|---|
| 3,873,802 A | * | 3/1975 | Sciaky | 219/121.13 |
| 5,097,780 A | * | 3/1992 | Winchester | 114/330 |
| 5,444,839 A | * | 8/1995 | Silverbrook et al. | 345/441 |
| 5,483,627 A | * | 1/1996 | Silverbrook et al. | 345/666 |
| 6,341,153 B1 | * | 1/2002 | Rivera et al. | 378/4 |
| 2003/0198374 A1 | * | 10/2003 | Hagene et al. | 382/141 |
| 2004/0016139 A1 | * | 1/2004 | Lam et al. | 33/544 |

* cited by examiner

Primary Examiner—L. Edmondson

(57) ABSTRACT

This invention relates to a method of spatially integrating multiple pipeline datasets. The method involves weld matching multiple inline inspection datasets by selecting one dataset as master and designated the other datasets as slaves, then spatially slaving the weld positions in the slaves to the weld positions in the master. After the weld matching process is completed, the method repositions the other data in the slave datasets relative to the master datasets, and which itself was previously spatially fit against a centreline model.

18 Claims, 4 Drawing Sheets

SPATIAL INTEGRATION OF PIPELINE DATASETS

FIELD OF THE INVENTION

This invention relates generally to data management and particularly to spatially integrating multiple pipeline datasets to form an integrated dataset.

BACKGROUND OF THE INVENTION

The petroleum pipeline infrastructure in North America, estimated at three million miles of pipeline, was constructed over a period of eighty years. Many of the operating pipelines are now more than 50 years old. In recent years public concern has arisen as a result of several high profile pipeline incidents that have had significant consequences, including the loss of life. As a result there is increased emphasis on improving the management of pipeline integrity. This increased emphasis has taken the form of laws, regulations, and industry standards leading to improved pipeline company practices.

A key component of effective pipeline integrity management is the integration of information about the condition of a pipeline so that site-specific risk analysis can be carried out to prioritize inspection and repair. As part of the process, data from multiple sources using multiple coordinate systems need to be translated and correlated into a common frame of reference so that data features can be aligned for observation of coincident events.

Unfortunately, in many cases pipeline operators are overwhelmed by this data and cannot effectively access, integrate, or analyze data relationships, thus limiting the value of this data in decision-making processes. There is thus a need to provide the pipeline industry with an effective and affordable way to meet these regulatory and operating challenges, and in particular, a need to effectively manage the vast amounts of collected data relating to pipeline infrastructure, in a way that enables pipeline operators to maintain pipeline integrity.

The traditional spatial integration technology, known as a Geographic Information System (GIS), was developed to function as a map-based interface for planning and marketing applications, but the known uses of GIS technologies for the integrity management of pipeline networks have been of limited success. Data management solutions based solely on a GIS require pipeline surveys without explicit positional information to be converted into a common linear reference system (typically chainage or stationing) such that disparate data sets may be overlaid and compared. This conversion, or spatial normalization, process is where much of the data management effort is spent and is often prone to error introduction. Even when small errors are introduced, the normalization process is often performed such that it is not auditable. If the underlying spatial errors are not reported, addressed, and understood, the value of the data integration and any subsequent analysis of the combined data set is questionable.

SUMMARY OF THE INVENTION

According to one aspect of the invention, there is provided a method of spatially integrating multiple pipeline datasets. The method comprises the following steps:

(a) receiving multiple inline inspection datasets, each dataset having data representing the positions of welds in a pipeline;

(b) designating one dataset as master and at least one other datasets as a slave; and (c) for each slave,
  (i) identifying at least one weld of the master as a seed weld and spatially matching the corresponding weld of the slave to the seed weld to form a seed weld pair;
  (ii) beginning at the pipeline position of the seed weld pair and proceeding in a selected pipeline direction, determining for each weld of the master whether there is a matching weld of the slave, by identifying a weld of the slave having a pipeline position within a selected error band distance of the pipeline position of the weld of the master;
  (iii) repositioning the pipeline position of each matched weld of the slave to the pipeline position of the corresponding weld of the master, then repositioning the pipeline positions of all other data in the slave dataset to correspond to the repositioned welds of the slave; then (d) compiling an integrated dataset comprising the data of the master and the repositioned data of each slave.

According to another aspect of the invention, the above method may be encoded on a computer readable medium as a program module, and be executed to automatically spatially integrate multiple pipeline datasets to produce a single integrated dataset.

The master may be defined as the first ILI run that is, or was previously, imported such that is fit against the centreline model. Correspondingly, all subsequent ILI datasets may be designated as slave ILI datasets. A weld of the master may be selected as the seed weld based on its proximity to a uniquely identifiable feature in the dataset, whereby it also is uniquely identifiable.

For each weld of the master where a matching weld of the slave could not be found, the selected error band may be increased for the next weld of the master along the selected pipeline direction, until the error band reaches a selected error band maximum. Also, for each weld of the master, the distance from the last matched weld may be determined and if the distance exceeds a selected maximum distance, the weld of the master may be designated as being unmatched, and then the next seed weld pair along the selected pipeline direction is selected or the method is stopped if no seed weld pair is found.

The step in the method involving the determination for each weld of the master whether there is a matching weld of the slave, can be performed in either upstream and downstream directions from the seed weld pair. In particular, the seed weld pair may be located in between a selected length of pipeline to be spatially integrated, and if so, the step in the method involving the determination for each weld of the master whether there is a matching weld of the slave, can be performed in both upstream and downstream directions from the seed weld pair.

When the weld matching process is concluded the slave dataset is merged into the existing asset survey containing the master dataset. In effect, the linear position of each slave weld is "snapped" to the linear position of the corresponding master weld and the points in the slave between matched welds are digitally "rubber sheeted" to the points in the master. Prior to the weld matching process the master dataset would have been fit against the centreline model by repositioning each fit point in the master dataset to the position of the corresponding fit points in the centreline model, then repositioning all of the other data in the master dataset to correspond to the repositioned fit points.

DETAILED DESCRIPTION OF EMBODIMENTS OF THE INVENTION

Figure 1:
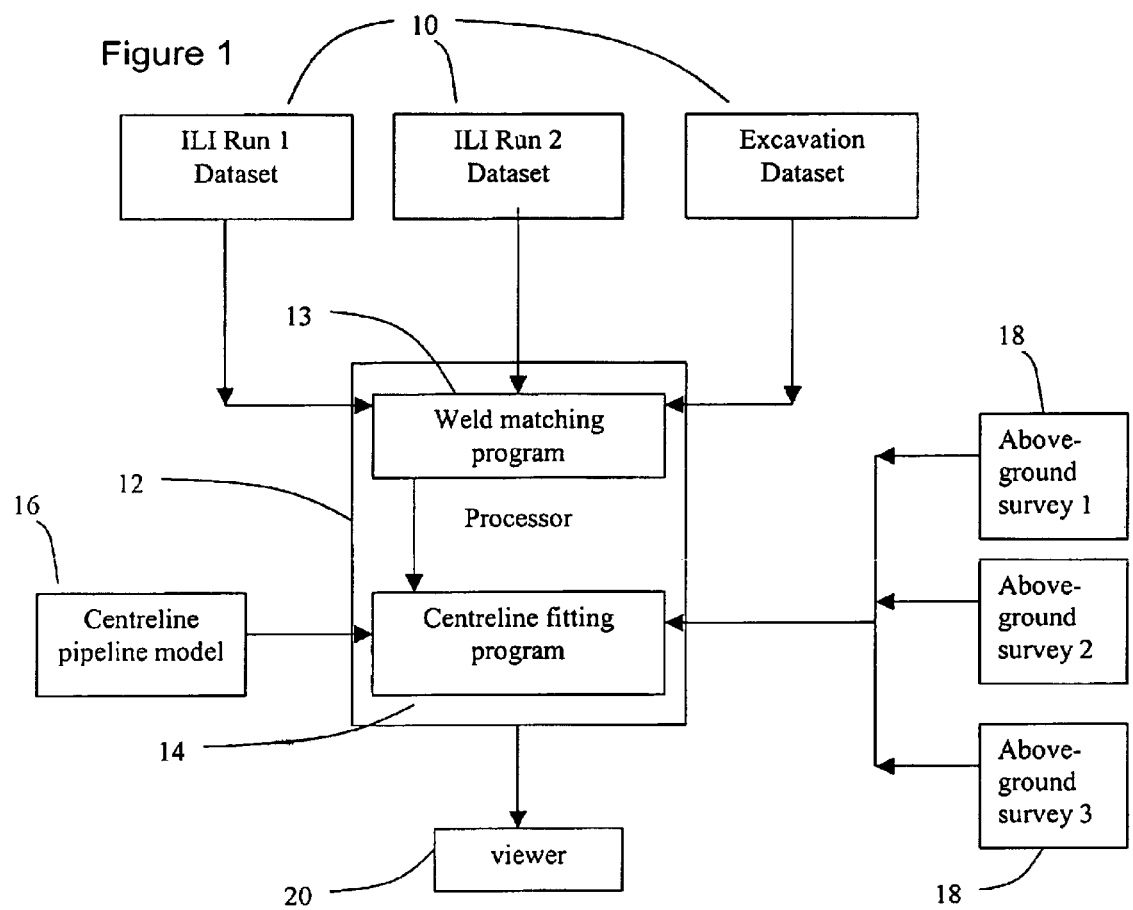
FIG. 1 is a schematic illustration of data flow into and out of a pipeline data processor programmed to spatially integrate multiple pipeline datasets.

One of the regulatory requirements for an integrity management program is for a pipeline operator to integrate pipeline information from diverse data sources so that a comprehensive analysis can be made of the threats to a pipeline's integrity. These data sources include:

Pipe property: This data is associated with the specifications and properties of the pipe, e.g. pipe thickness, coating data. The properties are generally consistent within each pipe joint. Consequently, these properties typically transition at the welds that join the joints of pipe together.

Above-ground surveys: This data includes all the above ground surveys associated with Direct Assessment (DA), such as Cathodic Protection (CP), Direct Current Voltage Gradient (DCVG), Pipeline Current Mapper (PCM), as well as other environmental parameters such as land use and topography.

In-Line Inspections (ILI): This data is collected from the measurements taken by inspection vehicles that travel along the interior of a pipeline. Such measurements are known as ILI surveys, and are typically performed while the pipeline is in operation; product flow is typically used to propel the inspection vehicle, although self-propelled models can also be used. The data collected by the ILI survey includes pipeline features such as valves, welds, and branch connections, and defects such as metal loss, dents, and cracks.

The data collected by the ILI survey is spatially organized by referencing the location of each measurement point in terms of a linear distance along the pipe to a selected start position in the pipe, e.g. the start of the ILI run. The linear distance can be determined by an odometer on the inspection vehicle, which tracks the distance travelled by the vehicle as the odometer wheel rolls along the inside surface of the pipeline.

Excavation: This data is generated from measurements taken during the course of an excavation or dig that exposes the pipe surface. The measurements can be spatially referenced to a control point, typically a girth weld that was exposed in the excavation.

Operational: This data typically relates to the product or environment inside the pipe.

According to an embodiment of the invention, there is provided a spatial integration method for spatially integrating datasets from different data sources, to produce a single integrated dataset that can be used, for example, by a pipeline operator to maintain the integrity of his pipeline. Unlike conventional GIS systems that simply overlay datasets for viewing purposes, the spatial integration method of this embodiment uses elements or fit points within each different dataset to spatially align the datasets not only relative to each other, but also to a "real world" location. Furthermore, the spatial integration method is provided with steps that spatially integrate multiple ILI datasets, by matching their respective welds. This enables new ILI datasets to be readily integrated with existing ILI datasets for a particular pipeline section.

Referring to FIG. 1, a data processor 12 is programmed with a pipeline dataset management program that can integrate multiple pipeline datasets and display information selected from one or more integrated datasets. The dataset management program comprises a weld-matching module 13 for spatially integrating ILI runs, to produce an integrated below-ground dataset ("asset survey"), and a centreline fitting program 14 to spatially integrate the asset survey against a 3-D pipeline model 16 and above-ground survey datasets 18. Selected information from the spatially integrated above-ground and below-ground datasets are transmittable to a viewer 20 for viewing.

Below Ground Data: In-Line Inspection (ILI) Surveys

In-line Inspection (ILI) is the process of running an instrument along the inside of a pipeline to detect injurious features in the pipe wall. An ILI tool is typically free flowing (no umbilical) and is propelled down the pipeline by the movement of the product (gas, oil water etc.) along the pipeline. The ILI tool records the location of the features it detects by associating a linear measure along the pipeline to each of these features. The linear measure or odometer distance is determined by counting the revolutions of onboard odometer wheels that are rolling along the internal surface of the pipeline as the tool travels along the pipeline. Circumferential welds used to connect the joints of pipe represent a commonly identifiable feature occurring on a more or less regular interval along the pipeline. Multiple ILI runs are integrated with each other through a weld matching process that takes into consideration that there is not necessarily a one to one match given the potential for misidentification of welds as well as the possibility the weld tally could have been modified due to pipe replacements or cut-outs. This process of integrating the ILI runs through alignment of the welds minimizes the relative error between the multiple ILI runs or data sets by re-zeroing the odometer error at each set of matched welds.

Figure 2:
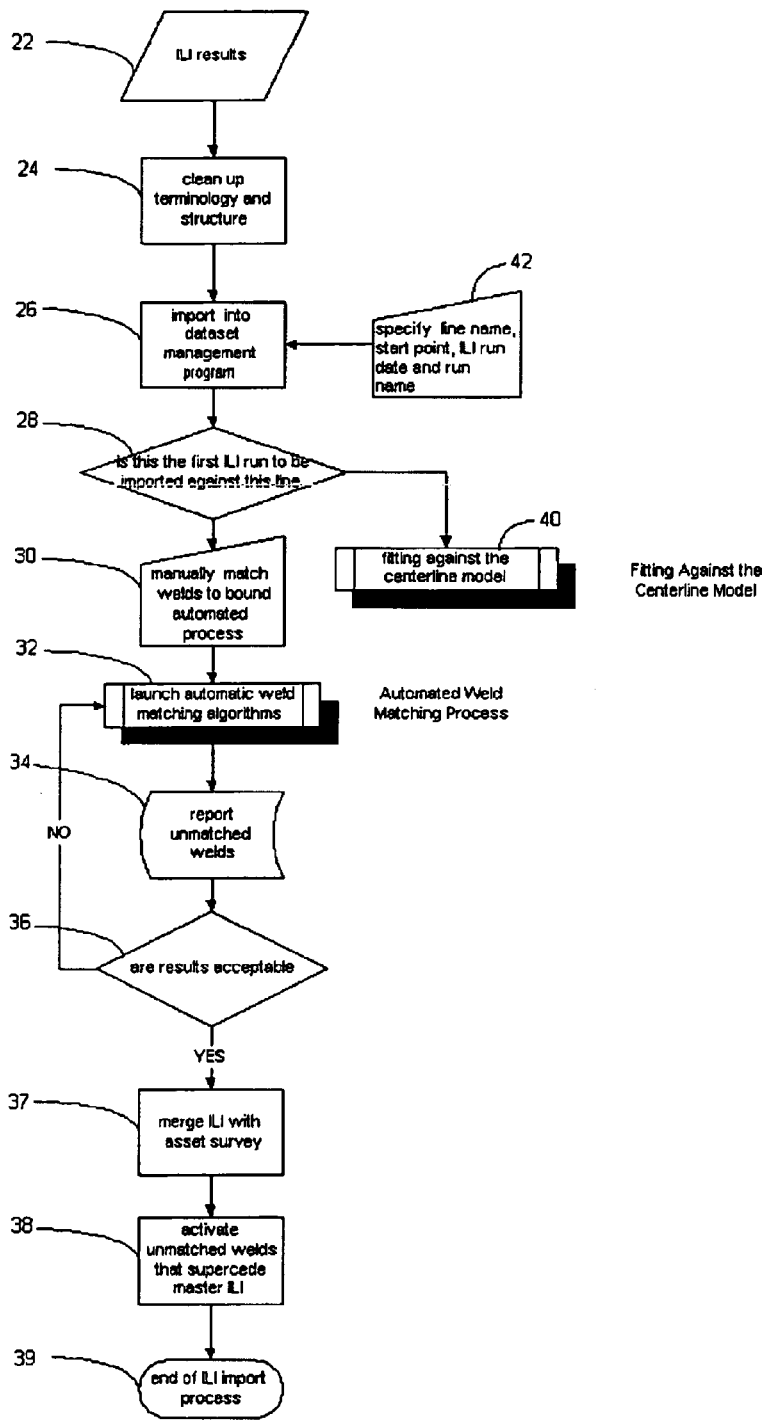
FIG. 2 is a flowchart of an inline inspection (ILI) dataset integration process.

Given the number of welds within an ILI run of 100 km (at least one weld occurs every 40 to 80 feet depending on the pipe manufacturing process), it is evident that the ILI weld tally is voluminous. Therefore, the spatial integration module 13 of the dataset management program is provided to automate the spatial integration aspect of the ILI dataset integration process whereas the centreline fitting program 14 accurately positions the ILI indications in space ("real world" coordinates). Referring to FIG. 2, the ILI dataset integration process begins first by obtaining a tabulation of all ILI indications (shown as process block 22 in FIG. 2). As the terminology and data organization may vary from ILI run to ILI run, such terminology and data organization are formatted so that they are consistent and can be understood by the dataset management program (shown as process block 24 in FIG. 2).

The formatted ILI dataset 10 is then imported into the dataset management program (shown as process block 26 in FIG. 2). At this stage, an operator will manually specify a name for the ILI dataset, its start point in the pipeline, and its run date, if such information is not already provided (shown as process block 42 in FIG. 2).

Referring to process block 28 in FIG. 2, if the ILI dataset 10 is the first ILI dataset to be imported into the dataset management program, it is spatially integrated with the 3D pipeline model by executing the centreline fitting module in the program (shown as process block 40 in FIG. 2). If ILI datasets are already present, then this ILI dataset 10 is spatially integrated with the other ILI datasets by executing the weld matching module in the program (discussed in detail below); this is shown as process blocks 30, 32 in FIG. 2.

Once the weld-matching process has been completed, a report of the unmatched welds can be generated (process block 34 in FIG. 2) and a user can analyse this report. In particular, a user can determine the status of the unmatched welds as being "active", i.e. representing the current state of the pipeline, or "inactive", representing an obsolete or inaccurate state of the pipeline (process block 36 in FIG. 2).

Spatially Normalizing Multiple ILI Survey Datasets

The process of automatically spatially integrating multiple ILI datasets involves weld matching multiple ILI datasets to a single selected ILI dataset to produce a single integrated dataset. This single ILI dataset is known as the "master" and defines the joint lengths and weld positions of the integrated dataset. The master is defined by the as the first ILI run that is, or was previously, imported such that is fit against the centreline model. All subsequent ILI datasets are thereby designated as slave ILI datasets. Pairs of seed welds are defined along the pipeline by manually matching welds in the master ILI to a weld in a slave ILI. A seed weld pair is typically selected due the proximity of the welds to a uniquely identifiable feature in the ILI datasets such as a block valve. Although a single seed weld pair can be used to perform the spatial integration, selecting more matched pairs increases the accuracy of the integration. The data from the other ILI dataset is then spatially slaved to the master dataset by executing the weld matching module 13 of the dataset management program.

Figure 3:
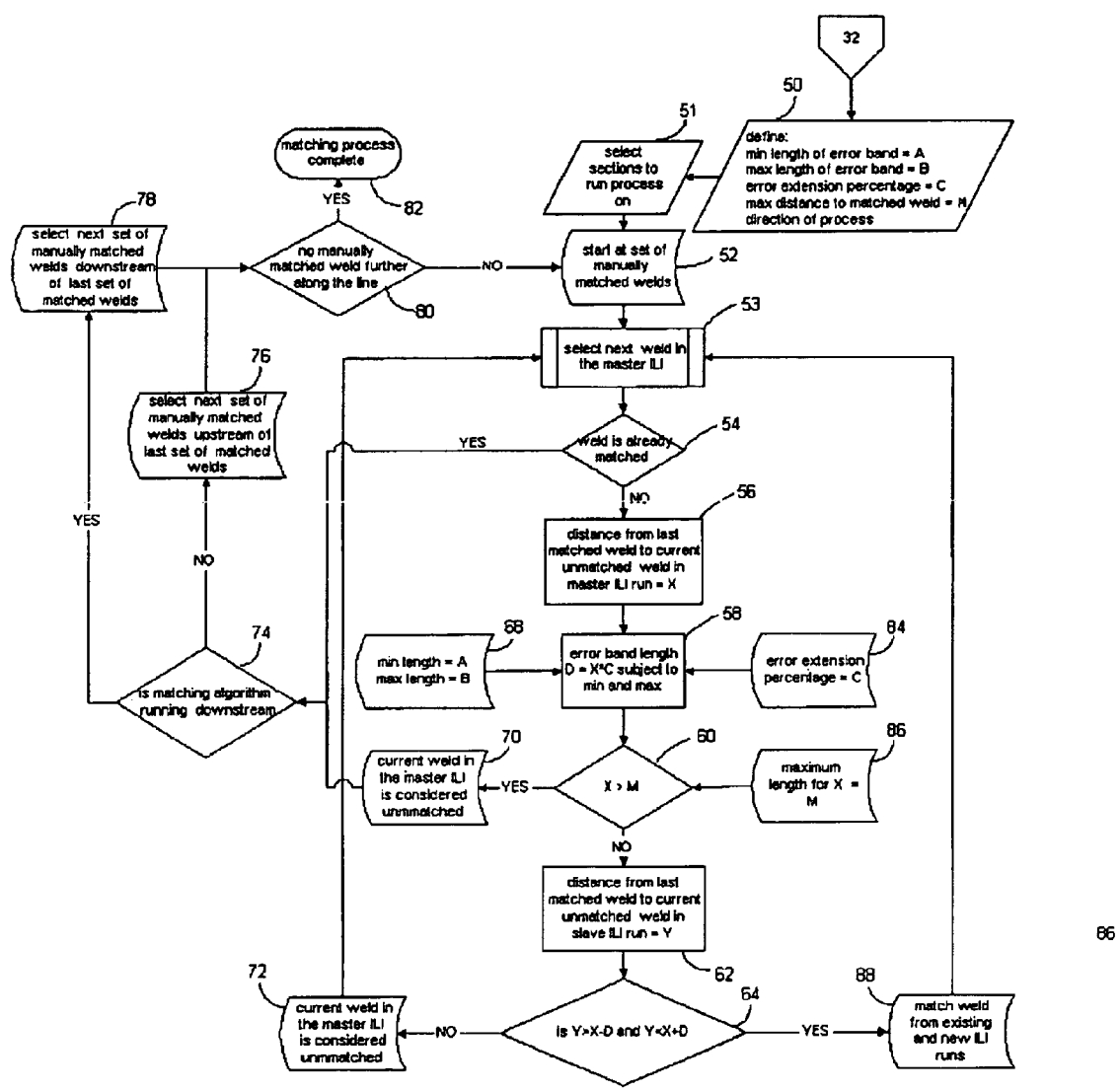
FIG. 3 is a flowchart of an automated weld matching sub-process of the ILI dataset integration process.

Referring to the flow chart in FIG. 3, the weld matching module 13 is programmed to carry out a spatial integration method comprising following steps:

Select bounding parameters for the spatial integration method, namely:

(i) minimum error band length A (process blocks 50 and 68)

(ii) maximum error band length B (process blocks 50 and 68)

(iii) error band extension percentage C (process blocks 50 and 84) and (iv) the maximum distance from the last matched weld that the method will try to locate a slave weld M (process blocks 50 and 80)

(v) the weld matching direction(s) (upstream or downstream or both)

Select the sections of pipeline for which the matching process is to be performed (process block 51). The sections are defined or bounded by the seed (matched) pairs of welds and the ends of the pipeline. This process is iterative in terms of selecting other sections or reversing the direction of match. At this point the automated process is launched.

Select the first seed weld pair as a start position for weld matching (process block 52). Where the seed weld pair is at one end of the pipe pipeline, the matching may be only performed in one direction. Otherwise, the matching process may be run in both directions.

Proceed to the next weld in the master along the selected weld matching direction (process block 53) and determine whether this weld has been matched, i.e. is a seed weld (process block 54). If not matched, then record distance $X_{[i]}$ as the distance from the last matched weld to the current selected unmatched master weld (process block 56). With this distance, determine an error band length $D_{[i]}$ as $X_{[i]}*C$ (process block 58) subject to the specified minimum and maximum error band lengths A and B, and check whether distance $X_{[i]}$ exceeds the selected maximum distance M (process block 60).

If $X_{[i]}$ is less than M then select the next unmatched weld in the slave in the selected weld matching direction. Then, record a distance $Y_{[i]}$ as the distance between the last matched weld to the current selected unmatched slave weld (process block 62). Then determine whether $Y_{[i]}$ is within the specified error band, i.e. is greater than X−D and less than X+D (process block 64). If yes, then match the selected slave weld with the selected master weld (process block 88) and return to process block 53 and select the next master weld to be matched. If no, then register that the selected master weld is unmatched (process block 72), and return to process block 53 to select the next master weld to be matched.

Referring back to process block 60, if the distance X exceeds M, record the current weld in the master as being unmatched (process block 70). Then, determine whether the weld matching is running upstream or downstream in the pipeline (process block 74) and proceed to select the next set of manually matched pair of welds in the selected matching direction (process blocks 76 and 78) and repeat the weld matching steps (process blocks 52 to 64). If there are no more manually matched welds along the pipeline section (process block 80), end the weld matching method (process block 82).

When this iteration of weld matching process has completed, the program compiles all the weld matches, and provides an exception tally. Depending on the results, the process can be repeated with the additional seed welds pairs, alternative section of pipe or in the reverse direction.

When the weld matching process is concluded the slave ILI data is merged into the existing asset survey containing the master ILI. At this point for each pair of matched welds, the linear position of the matched slave weld is assigned the linear position of the corresponding master weld, and the linear positions of points in the slave dataset that are between the current matched weld and the previously matched weld are repositioned by interpolation. In effect, the linear position of the slave weld is "snapped" to the linear position of the master weld and the points in the slave between matched welds are digitally "rubber sheeted" to the points in the master.

Normalizing Above-Ground with Below-Ground Data

Above ground data is normalized against the below ground or "on-pipe" data by fitting both types of data against a common datum or control. The datum is a centreline model of the pipe, preferably a three-dimensional model 16. The on-pipe data set is primarily the weld tally and all elements that are either references from them (e.g. anomalies) or linked to them (e.g. pipe property data). Points that are common to both the centreline model 16 and either an above ground survey or below ground dataset (asset survey) are aligned by stretching or shrinking the respective datasets so that the points in the dataset match with corresponding points in the centreline model 16. The result is a linear extension or reduction of the survey dataset between each pair of consecutive fit points. For each survey dataset, a record is kept of not only which points were aligned, but also of the magnitude of the modification required to the survey in order to align each pair of points. If a new fit point is added at a later time the survey is refit between the new fit point and the nearest upstream and downstream fit points. However, if a fit point on the centreline model 16 is moved, all the survey datasets that referenced that fit point are accordingly refit along the section of pipe.

Figure 4:
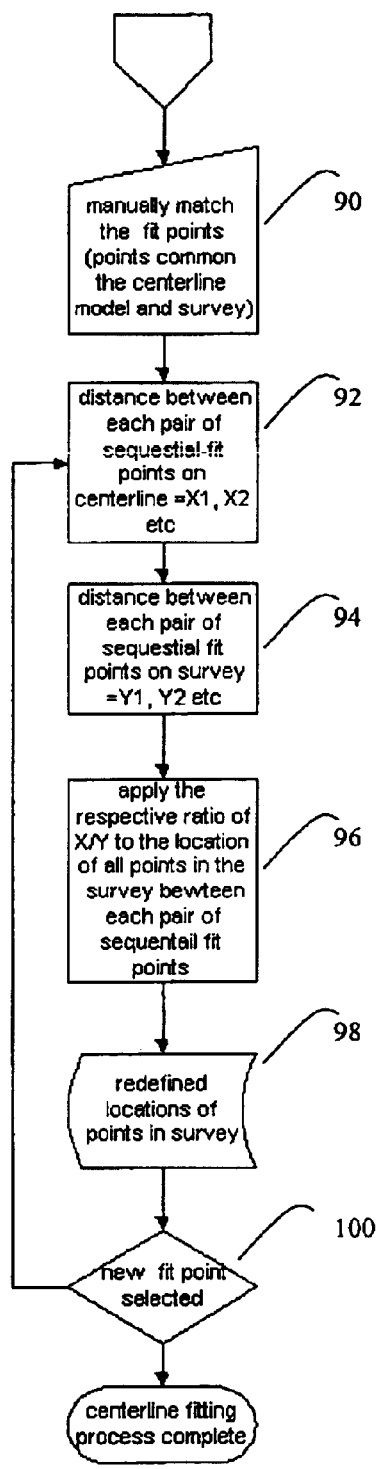
FIG. 4 is a flowchart of a centreline fitting sub-process of the ILI dataset integration process.

The process of fitting a survey dataset against the centreline model 16 not only spatially normalizes it against the other survey datasets, but also accurately locates the survey data in "real world" space, subject to the accuracy of the centreline model against which it is being fit. Referring to FIG. 4, the centreline fitting module 14 spatially integrates an asset survey (i.e. the integrated ILI dataset) against the centreline model 16 by carrying out the following steps:

Manually match the fit points common to the centreline model 16 and the asset survey (process block 90). Then, determine the distances $X_{[i]}$ between each pair of sequential matched fit points on the centreline model 16 (process block 92). Then, determine the distances $Y_{[i]}$ between each pair of sequential matched fit points on the asset survey (process block 94). Apply the respective ratio of X/Y to the location of all points in the survey between each pair of sequential fit points (process block 96) to generate redefined locations of points in the asset survey. Record these redefined locations (process block 98).

While the present invention has been described herein by the preferred embodiments, it will be understood to those skilled in the art that various changes may be made and added to the invention. The changes and alternatives are considered within the spirit and scope of the present invention.

What is claimed is:

1. A method of spatially integrating multiple pipeline datasets, comprising:
   (a) receiving multiple inline inspection datasets, each dataset having data representing the positions of welds in a pipeline;
   (b) designating one dataset as master and the at least one other dataset as slave; and
   (c) for each slave,
      (i) identifying at least one weld of the master as a seed weld and spatially matching the corresponding weld of the slave to the seed weld to form a seed weld pair;
      (ii) beginning at the pipeline position of the seed weld pair and proceeding in a selected pipeline direction, determining for each weld of the master whether there is a matching weld of the slave, by identifying a weld of the slave having a pipeline position within a selected error band distance of the pipeline position of the weld of the master;
      (iii) repositioning the pipeline position of each matched weld of the slave to the pipeline position of the corresponding weld of the master, then repositioning the pipeline positions of all other data in the slave dataset to correspond to the repositioned welds of the slave; then
   (d) compiling an integrated dataset comprising the data of the master and the repositioned data of each slave.

2. The method of claim 1 wherein for each weld of the master where a matching weld of the slave could not be found, increasing the selected error band for the next weld of the master along the selected pipeline direction, until the error band reaches a selected error band maximum.

3. The method of claim 1 further comprising for each weld of the master, determining the distance from the last matched weld and if the distance exceeds a selected maximum distance, designating the weld of the master as being unmatched, then selecting the next seed weld pair along the selected pipeline direction or stopping the method if no seed weld pair is found.

4. The method of claim 1 wherein the seed weld pair is located in between a selected length of pipeline to be spatially integrated, and in step (c), the determination for each weld of the master whether there is a matching weld of the slave is performed in both upstream and downstream directions from the seed weld pair.

5. The method of claim 1 further comprising after (d), receiving a new inline inspection dataset, designating the new dataset as a new slave, then spatially integrating the new slave to the integrated dataset according to step (c).

6. The method of claim 1 wherein the first received inline inspection dataset is fit against a centreline model and designated the master, and all subsequent received inline inspection datasets are designated as slave ILI datasets.

7. The method of claim 6 wherein the master is fit against the centreline model by repositioning each fit point in the master dataset to the position of a corresponding fit point in the centreline model, then repositioning all of the other data in the master dataset to correspond to the repositioned fit points.

8. The method of claim 1 wherein a uniquely identifiable weld of the master is selected as the seed weld.

9. The method of claim 8 wherein the seed weld of the master is uniquely identifiable by being in proximity to a uniquely identifiable feature in the master dataset.

10. A computer-readable medium encoded with a program module that spatially integrates multiple pipeline datasets by:
    (a) receiving multiple inline inspection datasets, each dataset having data representing the positions of welds in a pipeline;
    (b) designating one dataset as master and the at least one other dataset as slave; and
    (c) for each slave,
       (i) identifying at least one weld of the master as a seed weld and spatially matching the corresponding weld of the slave to the seed weld to form a seed weld pair;
       (ii) beginning at the pipeline position of the seed weld pair and proceeding in a selected pipeline direction, determining for each weld of the master whether there is a matching weld of the slave, by identifying a weld of the slave having a pipeline position within a selected error band distance of the pipeline position of the weld of the master;
       (iii) repositioning the pipeline position of each matched weld of the slave to the pipeline position of the corresponding weld of the master, then repositioning the pipeline positions of all other data in the slave dataset to correspond to the repositioned welds of the slave; then
    (d) compiling an integrated dataset comprising the data of the master and the repositioned data of each slave.

11. The medium of claim 10 wherein for each weld of the master where a matching weld of the slave could not be found, increasing the selected error band for the next weld of the master along the selected pipeline direction, until the error band reaches a selected error band maximum.

12. The medium of claim 10 further comprising for each weld of the master, determining the distance from the last matched weld and if the distance exceeds a selected maximum distance, designating the weld of the master as being unmatched, then selecting the next seed weld pair along the selected pipeline direction or stopping the method if no seed weld pair is found.

13. The medium of claim 10 wherein the seed weld pair is located in between a selected length of pipeline to be spatially integrated, and in step (c), the determination for each weld of the master whether there is a matching weld of the slave is performed in both upstream and downstream directions from the seed weld pair.

14. The medium of claim 10 further comprising after (d), receiving a new inline inspection dataset, designating the new dataset as a new slave, then spatially integrating the new slave to the integrated dataset according to step (c).

15. The medium of claim 10 wherein the first received inline inspection dataset is fit against a centreline model and designated the master, and all subsequent received inline inspection datasets are designated as slave ILI datasets.

16. The medium of claim 15 wherein the master is fit against the centreline model by repositioning each fit point in the master dataset to the position of a corresponding fit point in the centreline model, then repositioning all of the other data in the master dataset to correspond to the repositioned fit points.

17. The medium of claim 10 wherein a uniquely identifiable weld of the master is selected as the seed weld.

18. The medium of claim 17 wherein the seed weld of the master is uniquely identifiable by being in proximity to a uniquely identifiable feature in the master dataset.

* * * * *